(12) United States Patent
Maher et al.

(10) Patent No.: US 11,559,917 B2
(45) Date of Patent: Jan. 24, 2023

(54) DROP ROLLER PRESS AND METHOD OF MAKING RECESSED PANEL DOORS

(71) Applicant: JELD-WEN, Inc., Charlotte, NC (US)

(72) Inventors: Daniel Maher, Pottsville, PA (US);
Wilson Brown, Wilkesboro, NC (US)

(73) Assignee: JELD-WEN, INC., Charlotte, NC (US)

( * ) Notice: Subject to any disclaimer, the term of this patent is extended or adjusted under 35 U.S.C. 154(b) by 328 days.

(21) Appl. No.: 16/870,756

(22) Filed: May 8, 2020

(65) Prior Publication Data

US 2021/0348440 A1    Nov. 11, 2021

(51) Int. Cl.
| | |
|---|---|
| *E06B 3/72* | (2006.01) |
| *B27M 3/18* | (2006.01) |
| *E06B 3/70* | (2006.01) |
| *B32B 37/10* | (2006.01) |
| *B32B 37/00* | (2006.01) |
| *B32B 37/16* | (2006.01) |
| *B32B 38/18* | (2006.01) |
| *B32B 41/00* | (2006.01) |

(52) U.S. Cl.
CPC ............ *B27M 3/18* (2013.01); *B32B 37/0053* (2013.01); *B32B 37/10* (2013.01); *B32B 37/16* (2013.01); *B32B 38/1833* (2013.01); *B32B 41/00* (2013.01); *E06B 3/7001* (2013.01); *E06B 3/72* (2013.01); *B32B 2309/12* (2013.01); *B32B 2309/72* (2013.01); *E06B 3/7017* (2013.01)

(58) Field of Classification Search
CPC .............................. B27M 3/18; B32B 37/0053
See application file for complete search history.

(56) References Cited

U.S. PATENT DOCUMENTS

| | | | |
|---|---|---|---|
| 670,939 | A | 4/1901 | Rapp |
| 1,183,842 | A | 5/1916 | Alling |
| 2,196,470 | A | 4/1940 | Montgomery et al. |
| 2,419,346 | A | 4/1947 | Ellis |
| 2,511,620 | A | 6/1950 | MacMillan |
| 2,608,500 | A | 8/1952 | Del |
| 2,670,026 | A | 2/1954 | Ungar |
| 2,674,295 | A | 4/1954 | Steele et al. |
| 2,695,430 | A | 11/1954 | Wakefield |
| 2,765,056 | A | 10/1956 | Tyree |
| 2,791,809 | A | 5/1957 | Lincoln, Jr. |
| 2,809,403 | A | 10/1957 | Clements |
| 2,827,670 | A | 3/1958 | Schwindt |
| 2,828,235 | A | 3/1958 | Holland et al. |
| 2,848,132 | A | 8/1958 | Davous |

(Continued)

FOREIGN PATENT DOCUMENTS

| | | |
|---|---|---|
| DE | 195 44 653 C1 | 4/1997 |
| EP | 2281671 B1 | 9/2015 |
| GB | 2324061 A | 10/1998 |

*Primary Examiner* — Philip C Tucker
*Assistant Examiner* — John Blades
(74) *Attorney, Agent, or Firm* — Lorenz & Kopf, LLP

(57) ABSTRACT

The disclosure relates to systems and methods for pressing a door assembly involving a scanning system operable to survey an outer surface of a door skin and identify a location of one or more recessed panel portions on the door skin, and a press operable to selectably actuate a group of actuators based on the identified location of the recessed panel portions, where the actuators drive press members onto the one or more recessed panel portions of the door skin during a pressing operation to facilitate crushing of portions of a core of the door assembly that underlie the recessed panel portion of the door skin.

20 Claims, 6 Drawing Sheets

(56) References Cited

U.S. PATENT DOCUMENTS

| | | |
|---|---|---|
| 2,893,076 A | 7/1959 | Herts |
| 2,950,038 A | 8/1960 | Rupp |
| 2,980,573 A | 4/1961 | Clifford |
| 3,018,205 A | 1/1962 | Barut |
| 3,049,461 A | 8/1962 | Beahm et al. |
| 3,070,198 A | 12/1962 | Haskell |
| 3,079,887 A | 3/1963 | Dawkins |
| 3,227,599 A | 1/1966 | Holland et al. |
| 3,296,059 A | 1/1967 | Schwindt |
| 3,342,666 A | 9/1967 | Hull |
| 3,385,002 A | 5/1968 | Quinif |
| 3,389,665 A | 6/1968 | Kauffman |
| 3,405,659 A | 10/1968 | Hees |
| 3,464,367 A | 9/1969 | Latter |
| 3,493,450 A | 2/1970 | Judge |
| 3,501,367 A | 3/1970 | Parker |
| 3,581,675 A | 6/1971 | Kauffman |
| 3,593,671 A | 7/1971 | Bramlett |
| 3,594,989 A | 7/1971 | Bastiaans |
| 3,618,535 A | 11/1971 | Hees |
| 3,704,563 A | 12/1972 | Arthur |
| 3,709,161 A | 1/1973 | Kauffman |
| 3,823,675 A | 7/1974 | Farley |
| 4,007,309 A | 2/1977 | Sewell |
| 4,084,367 A | 4/1978 | Saylor et al. |
| 4,085,762 A | 4/1978 | O'Brian |
| 4,109,587 A | 8/1978 | Jansen |
| 4,130,682 A | 12/1978 | Lauko |
| 4,194,313 A | 3/1980 | Downing |
| 4,236,365 A | 12/1980 | Wheeler |
| 4,247,237 A | 1/1981 | Brown |
| 4,265,067 A | 5/1981 | Palmer |
| 4,291,080 A | 9/1981 | Ely et al. |
| 4,294,055 A | 10/1981 | Andresen et al. |
| 4,300,864 A | 11/1981 | Liebel et al. |
| 4,349,303 A | 9/1982 | Liebel et al. |
| 4,363,579 A | 12/1982 | Rogers |
| 4,372,717 A | 2/1983 | Sewell et al. |
| 4,386,881 A | 6/1983 | Liebel |
| 4,431,474 A | 2/1984 | Gronek |
| 4,494,897 A | 1/1985 | Rogers |
| 4,516,891 A | 5/1985 | Wnuk et al. |
| 4,579,613 A | 4/1986 | Belanger |
| 4,583,338 A | 4/1986 | Sewell et al. |
| 4,585,381 A | 4/1986 | Boyse |
| 4,643,787 A | 2/1987 | Goodman |
| 4,677,012 A | 6/1987 | Anderson |
| 4,685,986 A | 8/1987 | Anderson |
| 4,796,369 A | 1/1989 | Hamann |
| 4,811,538 A | 3/1989 | Lehnert et al. |
| 4,865,889 A | 9/1989 | Boyse |
| 4,896,471 A | 1/1990 | Turner |
| 4,928,415 A | 5/1990 | Walters |
| 4,948,445 A | 8/1990 | Hees |
| 5,062,751 A | 11/1991 | Liebel |
| D327,433 S | 6/1992 | Sewell |
| 5,132,156 A | 7/1992 | Trassure, Jr. et al. |
| 5,139,842 A | 8/1992 | Sewell |
| 5,142,835 A | 9/1992 | Mrocca et al. |
| 5,152,647 A | 10/1992 | Sewell |
| 5,155,959 A | 10/1992 | Richards et al. |
| D331,014 S | 11/1992 | Sewell |
| D331,193 S | 11/1992 | Nilsen |
| 5,167,105 A | 12/1992 | Isban et al. |
| 5,171,114 A | 12/1992 | Dunn |
| D345,502 S | 3/1994 | Clar |
| 5,296,280 A | 3/1994 | Lin et al. |
| 5,306,100 A | 4/1994 | Higginbotham |
| 5,328,744 A | 7/1994 | Kaufmann et al. |
| 5,465,672 A | 11/1995 | Boyse et al. |
| 5,466,211 A | 11/1995 | Komarek |
| 5,486,078 A | 1/1996 | Wise |
| 5,560,168 A | 10/1996 | Gagne et al. |
| 5,573,818 A | 11/1996 | Haywood et al. |
| 5,582,571 A | 12/1996 | Simpson et al. |
| 5,678,968 A | 10/1997 | Bourgeois et al. |
| 5,681,641 A | 10/1997 | Grigsby et al. |
| 5,690,601 A | 11/1997 | Cummings et al. |
| 5,701,621 A | 12/1997 | Landi |
| 5,714,226 A | 2/1998 | Disselbeck |
| 5,789,059 A | 8/1998 | Nomoto |
| 5,792,541 A | 8/1998 | Herrera |
| 5,845,439 A | 12/1998 | Hendley |
| 5,846,038 A | 12/1998 | Bostelman |
| 5,858,512 A | 1/1999 | Dit Picard et al. |
| 5,875,608 A | 3/1999 | Quinif |
| 5,875,609 A | 3/1999 | Quinif |
| 5,887,402 A | 3/1999 | Ruggie et al. |
| D407,647 S | 4/1999 | Merricks et al. |
| 5,992,127 A | 11/1999 | Quinif |
| 6,033,167 A | 3/2000 | Bourgeois |
| 6,073,419 A | 6/2000 | Moyes |
| 6,132,836 A | 10/2000 | Quinif |
| 6,170,224 B1 | 1/2001 | Boyse et al. |
| 6,319,586 B1 | 11/2001 | Colson |
| 6,485,800 B1 | 11/2002 | Liittschwager et al. |
| D470,414 S | 2/2003 | Hsu |
| 6,551,441 B1 | 4/2003 | Sato et al. |
| 6,743,318 B2 | 6/2004 | Vaders |
| 6,852,192 B2 | 2/2005 | Sato et al. |
| D527,558 S | 9/2006 | Ng et al. |
| 7,137,232 B2 | 11/2006 | Lynch et al. |
| 7,314,534 B2 | 1/2008 | Hardwick et al. |
| 7,390,447 B1 | 6/2008 | Clark et al. |
| 7,399,438 B2 | 7/2008 | Clark et al. |
| D584,621 S | 1/2009 | Jean |
| 7,481,900 B1 | 1/2009 | Quinif |
| 7,640,073 B2* | 12/2009 | Lawson ............... G05B 19/401 700/186 |
| 7,718,246 B2 | 5/2010 | Strauss |
| D617,642 S | 6/2010 | Jonzon et al. |
| 7,798,754 B2 | 9/2010 | Funk et al. |
| 7,819,163 B2 | 10/2010 | Tyler |
| D629,687 S | 12/2010 | Baker |
| 7,866,119 B2 | 1/2011 | Hardwick et al. |
| 7,919,186 B2 | 4/2011 | Clark et al. |
| 7,964,051 B2 | 6/2011 | Lynch et al. |
| 8,087,212 B2 | 1/2012 | Hardwick et al. |
| 8,123,895 B2 | 2/2012 | Tyler |
| 8,226,788 B1 | 7/2012 | Quinif |
| D667,727 S | 9/2012 | Diaz et al. |
| 8,256,177 B2 | 9/2012 | Pfau et al. |
| 8,317,959 B2 | 11/2012 | Hardwick et al. |
| 8,524,351 B2 | 9/2013 | Ross |
| 8,535,471 B2 | 9/2013 | Luetgert et al. |
| 8,590,273 B2 | 11/2013 | Hardwick et al. |
| 8,677,707 B2 | 3/2014 | Lynch et al. |
| 8,864,926 B2 | 10/2014 | Pfau et al. |
| 10,232,599 B2 | 3/2019 | Cucchi et al. |
| 10,556,413 B2 | 2/2020 | Cossins |
| 2003/0098117 A1 | 5/2003 | Vaders |
| 2007/0110979 A1 | 5/2007 | Clark |
| 2007/0172631 A1 | 7/2007 | Hugerholtz |
| 2008/0020172 A1 | 1/2008 | Boyse |
| 2008/0145597 A1 | 6/2008 | Hendren |
| 2008/0145599 A1 | 6/2008 | Khan |
| 2009/0297763 A1 | 12/2009 | Ross |
| 2010/0139835 A1 | 6/2010 | Giles |
| 2012/0027999 A1 | 2/2012 | Liang et al. |
| 2012/0141717 A1 | 6/2012 | Overton |
| 2012/0160422 A1* | 6/2012 | Mori ............... B32B 37/10 156/391 |
| 2013/0340926 A1 | 12/2013 | Liang |
| 2014/0260080 A1 | 9/2014 | Swartzmiller |
| 2014/0261991 A1 | 9/2014 | Cucchi |
| 2015/0004355 A1 | 1/2015 | Diaz et al. |
| 2015/0027630 A1 | 1/2015 | Cucchi et al. |
| 2015/0267461 A1 | 9/2015 | Parish |
| 2016/0339599 A1 | 11/2016 | Liang et al. |
| 2017/0072672 A1 | 3/2017 | Cossins |

* cited by examiner

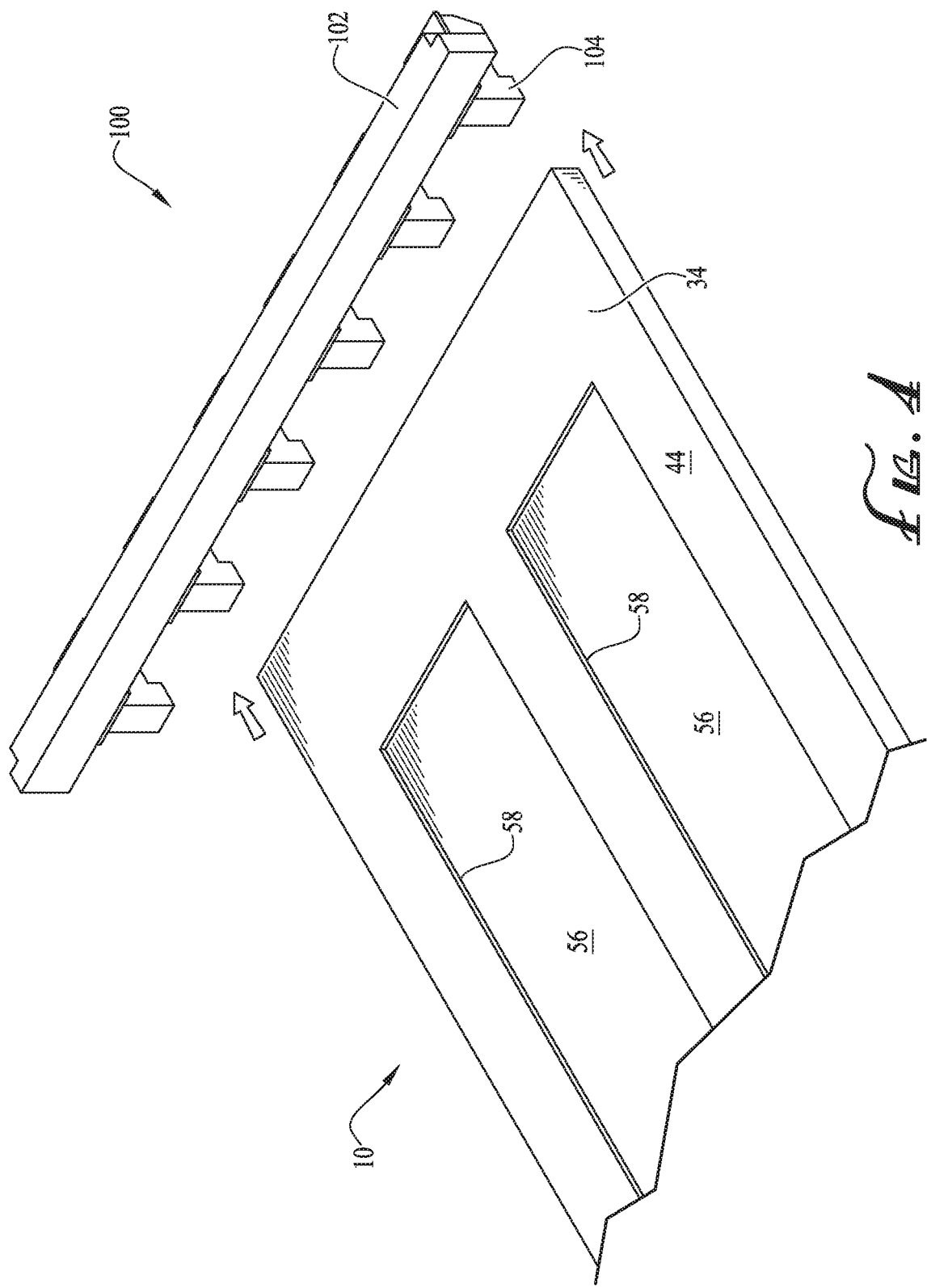

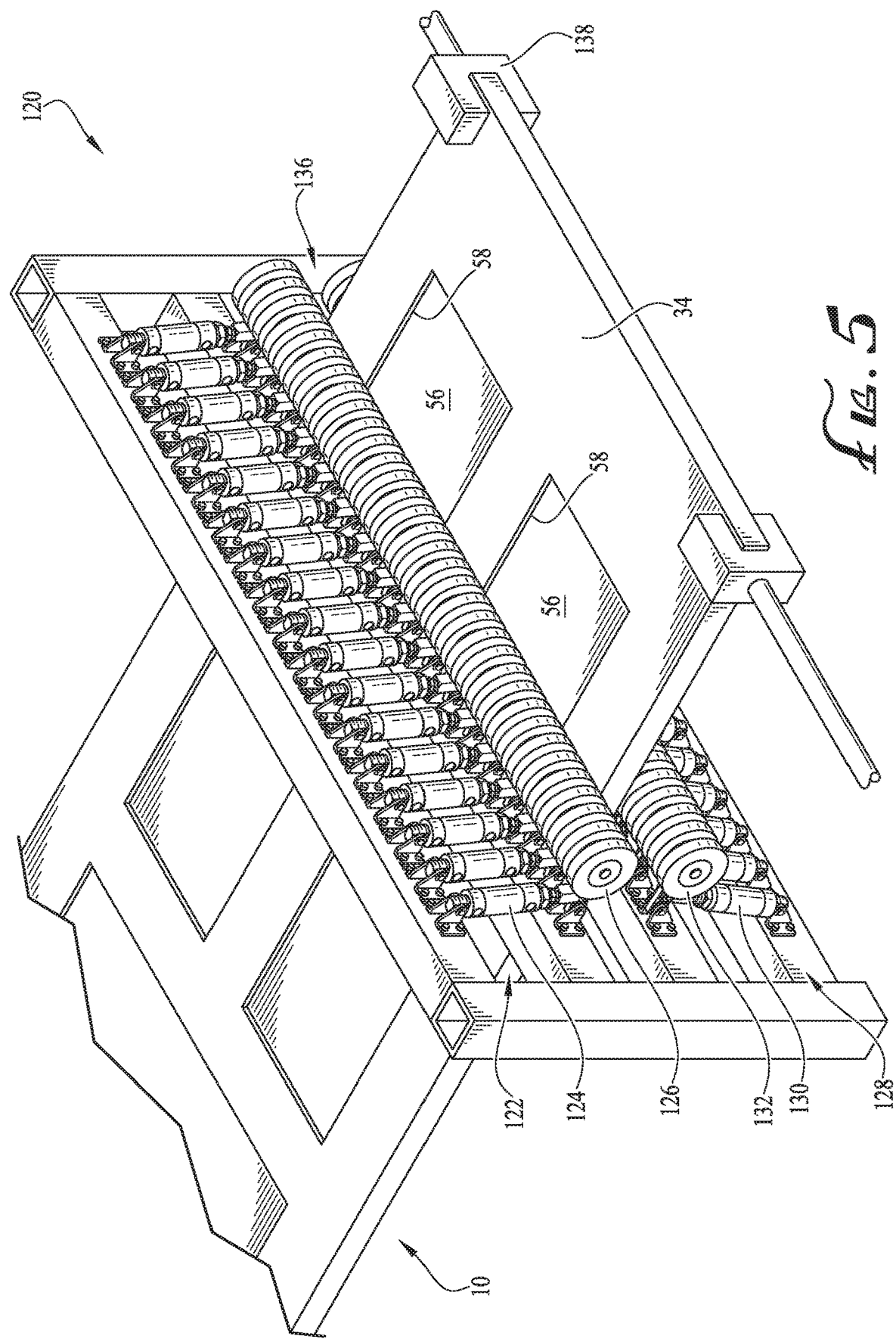

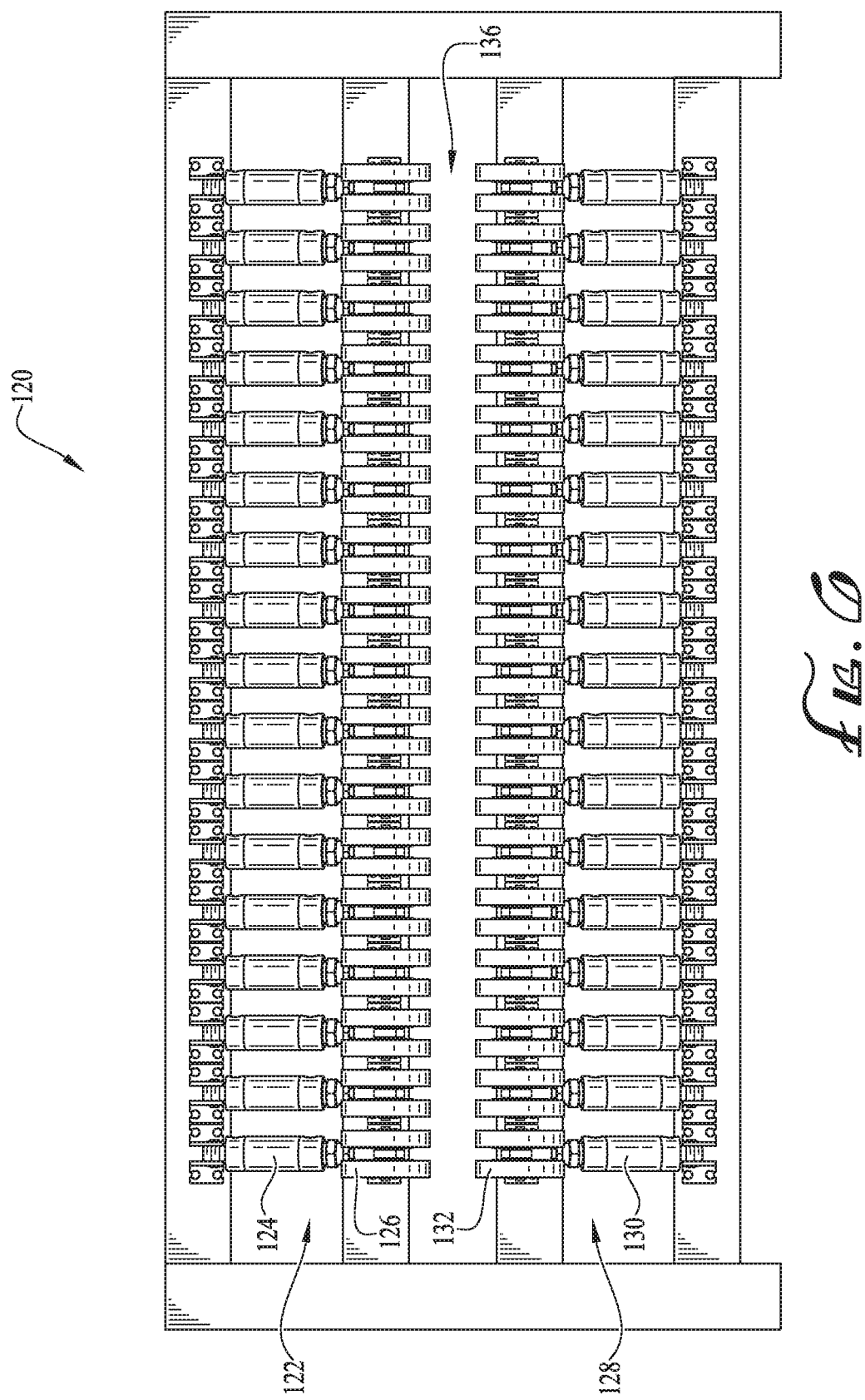

DROP ROLLER PRESS AND METHOD OF MAKING RECESSED PANEL DOORS

TECHNICAL FIELD

The field of the present disclosure relates generally to systems and methods for making and assembling recessed panel doors.

BACKGROUND

In a conventional manufacturing process, a door is typically made from a pair of door skins attached to opposite sides of a core and secured together. For example, one method of assembling doors involves applying adhesive to an inside surface of each of the two door skins, and then stacking an internal frame and lightweight core material between the door skins. The core and door skins are then pressed together to bring the adhesive into contact with the frame. Thereafter, the assembly is fed into a heated press for curing the adhesive to complete the process and prepare the door for final processing, which may include edge trimming, paint, or application of other surface treatments as desired.

In some embodiments, the door skins include a combination of flat panel portions and inwardly-contoured channels that simulate the sticking regions of a traditional solid wood door. In many conventional press configurations, pressure is applied to the door components (e.g., the door skins and core) to promote bonding. However, in many conventional pressing processes, the pressure is applied primarily to the flat panel portions of the door skins, but no direct pressure is applied to the inwardly-contoured channels. As a result, some doors may fail to bond properly during the pressing and curing processes, especially along the inwardly-contoured channels where no pressure is applied, which may lead to separation of the door skins and core and create overall performance issues. Accordingly, the present inventors have identified a need for an improved system and method for manufacturing doors. Additional aspects and advantages will be apparent from the following detailed description of preferred embodiments, which proceeds with reference to the accompanying drawings.

BRIEF DESCRIPTION OF THE DRAWINGS

FIG. 4 is a schematic view of a scanning system for locating sticking regions and recessed panel portions of the panel door in accordance with one embodiment.

FIGS. 5 and 6 are schematic views of a drop roller press system for applying direct pressure to the recessed areas of the panel door in accordance with one embodiment.

DETAILED DESCRIPTION OF EXAMPLE EMBODIMENTS

Figure 1:
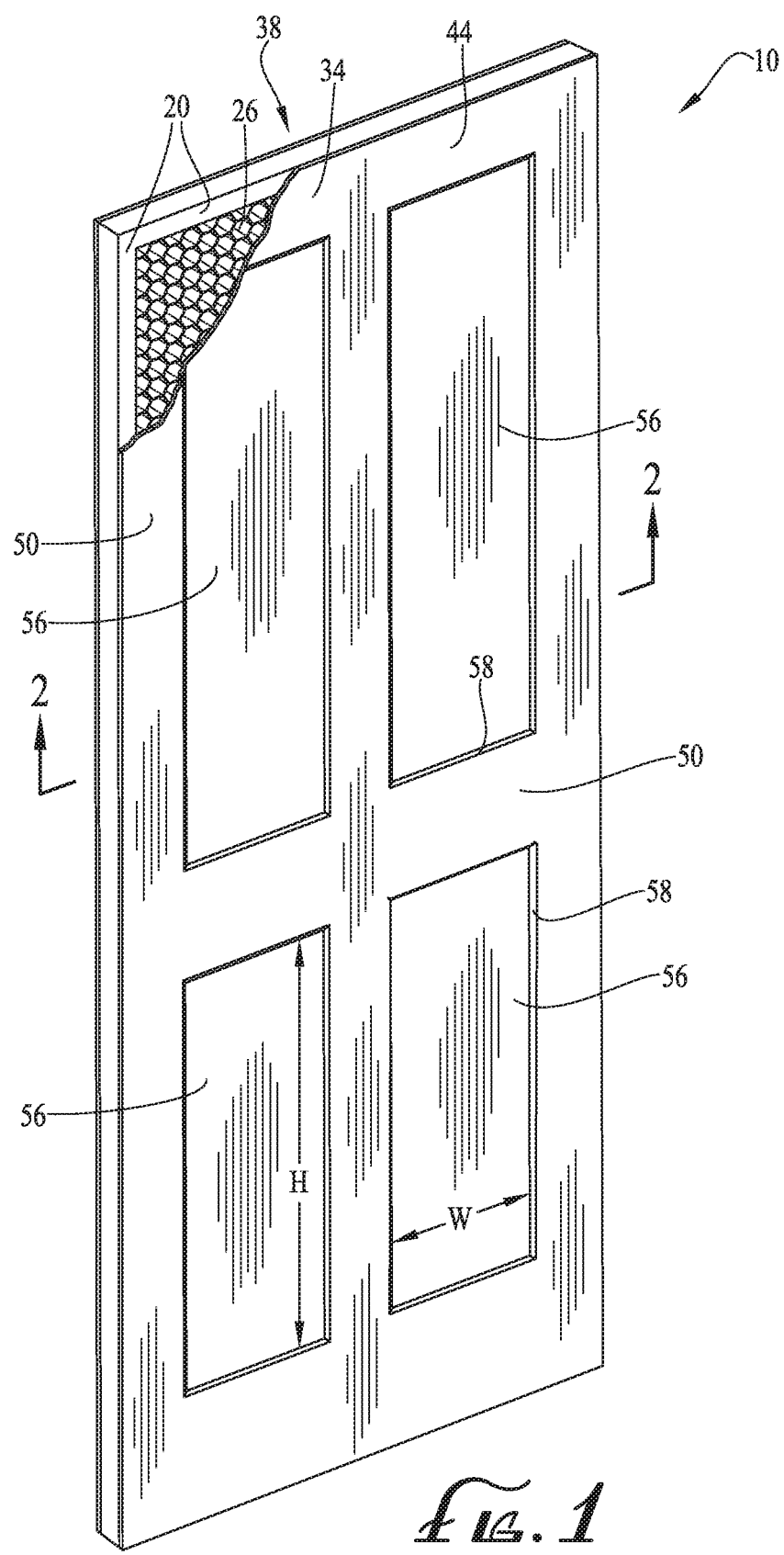
FIG. 1 is an isometric front view of a recessed-panel door, partially broken away to reveal an internal frame and core construction in accordance with one example embodiment.

With reference to the drawings, this section describes embodiments of a drop roller press system and methods for using the same in making recessed panel doors. Throughout the specification, reference to "one embodiment," "an embodiment," or "some embodiments" means that a described feature, structure, or characteristic may be included in at least one embodiment of the systems and methods described herein. Thus, appearances of the phrases "in one embodiment," "in an embodiment," or "in some embodiments" in various places throughout this specification are not necessarily all referring to the same embodiment. Furthermore, the described features, structures, and characteristics may be combined in any suitable manner in one or more embodiments. In view of the disclosure herein, those skilled in the art will recognize that the various embodiments can be practiced without one or more of the specific details or with other methods, components, materials, or the like. In some instances, well-known structures, materials, or operations are not shown or not described in detail to avoid obscuring aspects of the embodiments.

FIGS. 1-6 collectively illustrate embodiments of a drop roller press system 120 and related methods for making recessed panel doors 10. Briefly, a typical panel door 10 includes a frame 20 extending along the perimeter of the door 20 and defining an internal compartment filled by a core 26 of any suitable material. The door 10 further includes a pair of door skins 34, 38 surrounding the core 26 and adhesively coupled to the frame 20. In some embodiments, the door skins 34, 38 may be preformed with recessed panel regions 56, 86 that provide desirable contours to the outer profile of the door 10. During assembly, the door skins 34, 38 and core 26 are compressed together to facilitate the bonding process. However, as noted previously, many conventional press systems fail to apply direct pressure to the recessed areas and to the transition regions 58, 88 extending between the recessed panel regions 56, 86 and the flat, planar regions 50, 80 of the door skins 34, 38. Accordingly, the components of the door 10 may fail to bond properly, thereby potentially leading to separation of the door skins 34, 38 from the core 26 and/or frame 20.

With particular reference to FIGS. 4-6, the disclosed system includes a scanning system 100 designed to survey the door 10 and to identify the location of any surface features on the door 10, such as the recessed panel regions 56, 86 and the transition regions 58, 88, relative to a reference point on the door 10 (such as the top border or side edge borders of the door 10). The surface data obtained by the scanning system 100 is processed and stored in a programmable logic controller 110. Thereafter, the door 10 is transported to a drop roller press 120 that includes a plurality of actuatable top and bottom actuators 124, 130 (e.g., pneumatic cylinders) and press members 126, 132 (e.g., rollers) that are controllable based on the stored surface data and instructions from the programmable logic controller 110. The drop roller press 120 is designed to actuate a targeted subset of actuators 124, 130 and press members 126, 132 to apply direct pressure to the recessed panel regions 56, 58 and the transition regions 58, 88 (or other surface areas of interest) identified by the scanning system 100. As noted previously, these areas typically would not receive direct application of pressure in conventional presses. Subsequent to this roll pressing process, the door 10 may be transferred to a cold rolling press 150 for further pressing, then trimmed, finished, and packaged for shipment or sale. Additional details of each of these and other embodiments of the scanning system 100 and drop roller press 120 are described in further detail below with reference to the figures.

Figure 2:
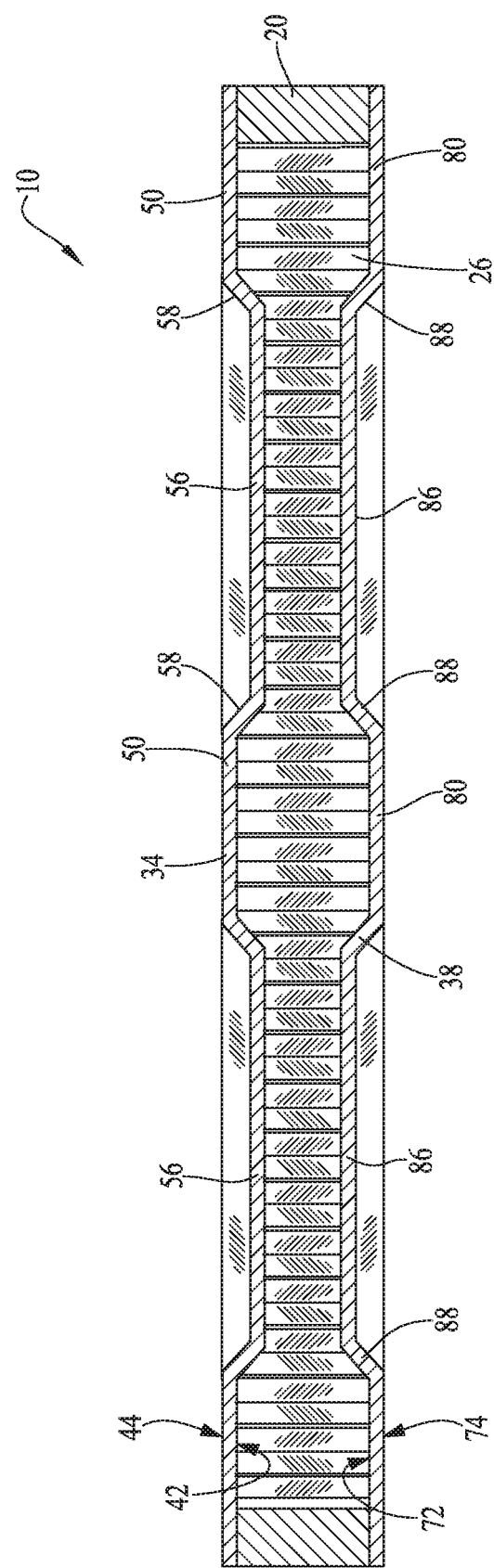
FIG. 2 is a schematic cross section view of the door of FIG. 1 taken along line 2-2 of FIG. 1 (not to scale).

FIGS. 1 and 2 illustrate a door 10, made by the method and system disclosed herein, in accordance with one embodiment. With reference to FIGS. 1-2, door 10 includes an internal frame 20 that extends around a perimeter of door 10 to define a cavity filled by a core 26. A first (or front) door skin 34 overlays a front surface of frame 20 and core 26. A second (or rear) door skin 38 (FIG. 2) overlays a rear surface of frame 20 opposite the front surface. First door skin 34 includes an inner surface 42 facing core 26 and frame 20, and an outer surface 44 forming the front surface of door 10. Inner surface 42 is coupled to the front surface of frame 20 by an adhesive or other suitable means. First door skin 34 preferably has a first planar portion 50 lying in a first plane. First planar portion 50 generally surrounds one or more recessed panel portions 56 (or panel regions) formed in first door skin 34, and may present the appearance of conventional stiles and rails.

Recessed panel portions 56 appear as shallow, indented regions in the outer surface 44 of first door skin 34, where the panel portions 56 are recessed relative to first planar portion 50. In some embodiments, recessed panel portions 56 may have a rectangular shape and planar surface as shown, or may have other regular or irregular shapes and contours contributing to the overall aesthetic design of door 10. Each recessed panel portion 56 may have a depth in the range of about 3-15 mm inwardly from first planar portion 50, for example, and may have width W in the range of about 50 mm to 1 m (or more typically in the range of about 100 mm to 800 mm) and a height H in the range of about 100 mm to 2.5 m (or more typically in the range of about 200 mm to 2 m). Transition regions 58, known in the art as "sticking" or simulated sticking, extend between and connect first planar portion 50 to recessed panel portions 56. First planar portion 50, panel portions 56, and transition regions 58 are preferably formed in a unitary sheet of material, such as molded high-density fiberboard, for example, that has a substantially uniform thickness throughout (but may be somewhat thinner at transition regions 58). One suitable door skin is made of a fiber composite material having a thickness in the range of about 1.1 mm to 6 mm, or 2 mm to 4 mm, or 2.5 mm to 3.5 mm. When first door skin 34 includes multiple recessed panel portions 56, they are typically substantially co-planar in a second plane that is parallel to and spaced inwardly from the first plane of first planar portion 50. The recessed panel portions 56 characterize door 10 as a recessed-panel door.

Similarly, second door skin 38 includes an inner surface 72 facing core 26 and frame 20 and an outer surface 74 forming a rear surface of door 10. Second door skin 38 is coupled to the rear surface of frame 20 by an adhesive. In second door skin 38, simulated stiles and rails comprise a second planar portion 80 lying in a third plane spaced apart from the first and second planes of first door skin 34. Second planar portion 80 surrounds one or more recessed panel portions (or panel regions) 86 that are recessed relative to second planar portion 80. Transition regions 88 (sticking), extend between and connect second planar portion 80 to recessed panel portions 86. When second door skin 38 includes multiple panel portions 86, they are typically substantially co-planar in a fourth plane parallel to and spaced inwardly from the third plane of second planar portion 80. Preferably, recessed panel portions 86 have similar dimensions in width, height, and depth as recessed panel portions 56 of first door skin 34. In an alternative embodiment (not shown), one of the first or second door skins 34, 38 may have a different ornamental design, different contours, different sticking, or panel regions that are not recessed, or may be entirely flat (flush) and lacking simulated sticking entirely.

In one example embodiment, core 26 comprises an expanded paper honeycomb material, which has a relatively high strength to weight ratio, but which is crushable by the press systems and methods described below. For example, the expanded paper honeycomb material of core 26 may have a compressive strength in the range of about 1.0 kg force per square cm ($kgf/cm^2$) to about 15 $kgf/cm^2$ (100 kPa to 1470 kPa) or more typically in the range of about 4 $kgf/cm^2$ to about 8 $kgf/cm^2$ (390 kPa to 785 kPa). Other structural materials that can be crushed or compressed under sufficient pressure may also be used for core 26, for example, expanded plastic film honeycomb material, corrugated cardboard, low density foam board, and others.

As noted previously, in a conventional press system, the components of the recessed panel door are compressed together to promote adhesive bonding. For example, in one conventional press system, an upper platen and a lower platen are designed to move toward one another to press the door skins 34, 38 together. Briefly, the door skins 34, 38 may be pre-formed in a door skin press process, including pre-forming recessed panel portions 56, 86 and transition regions 58, 88. Adhesive (not illustrated) is applied between first door skin 34 and frame 20 and between second door skin 38 and frame 20 to bond the door skins 34, 38 to frame 20. Frame 20 may be coated with adhesive before being stacked together with door skins 34, 38. Alternatively, door skins 34, 38 may be coated in the region of frame 20 or over their entire surface so they also adhere to core 26. Once the door skins 34, 38 are ready for pressing, the upper and lower platen contact the outer surfaces 44, 74 of the door skins 34, 38 along the respective first and second planar portions 50, 80, and press together the components of the door 10, so as to ensure positive contact between adhesive-coated surfaces of the internal frame 20 and door skins 34, 38. Once the door 10 has been pressed, the door 10 is ejected from the press and then may be transported for further processing via any suitable conveying means, such as a belt conveyor, powered rollers, or other transport system (not shown). In other embodiments, the door skins 34, 38 and core 26 may be pressed together in other suitable methods, such as via a roller press system or other suitable systems.

As noted previously, however, many conventional press systems and methods fail to apply direct pressure to the recessed panel regions 56, 86 and to most, if not all, of the transition regions 58, 88. With reference to FIGS. 4-6, the following describes example systems and methods of a drop roller press system 120 designed to remedy the deficiencies of conventional systems by applying direct pressure to the recessed panel regions 56, 86 and to the transition regions 58, 88 to ensure positive contact and promote proper bonding between the door skins 34, 38 and core 26. The pressing operation may also compress the core 26 between the recessed panel regions 56, 86 of door skins 34, 38, as is further described below. Example methods of assembling door 10 will now be described with collective reference to FIGS. 3-6.

Figure 3:
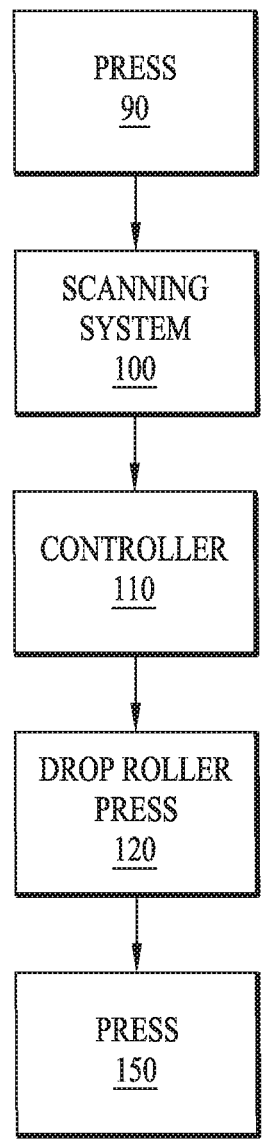
FIG. 3 is a block diagram illustrating an example manufacturing process for the recessed panel door in accordance with one embodiment.

FIG. 3 is a block diagram illustrating the overall concept of a manufacturing process for the recessed panel door 10 in accordance with one example embodiment. With reference to FIG. 3, the following discussion provides a brief overview of certain aspects of the manufacturing process for making the recessed panel door 10, followed by a more detailed description focusing primarily on the scanning system 100 of FIG. 4 and the drop roller press 120 of FIGS. 5 and 6.

With reference to FIG. 3, the door 10 is pressed using any suitable pressing method and system 90, such as the cold rolling pressing system described above with opposing platen. Once the door 10 has been pressed, the door 10 is transported from the press system 90 to a scanning system 100. In some embodiments, the scanning system 100 may be integrated with the press system 90, wherein both units sharing a common housing structure. In other embodiments, the systems 90, 100 may be standalone structures that are preferably operatively connected to one another via a suitable transport system to optimize the overall process.

As further described below with reference to FIG. 4, the scanning system 100 is designed to survey the outer surfaces 44, 74 of the door skins 34, 38 to identify any regions of the door 10 where a transition or recessed area, such as recessed panel regions 56, 86 or sticking regions 58, 88, is present. The surface data of the panel door 10 is communicated from the scanning system 100 to a programmable logic controller 110. After passing through the scanning system 100, the door 10 is transported to a drop roller press 120 having a plurality of actuators 124, 130 each bearing a press member 126, 132. The controller 110 is in operative communication with the drop roller press 120 and controls (or sends instructions to another controller to control) operation of the actuators 124, 130. In accordance with the surface data obtained by the scanning system 100, an appropriate subset of actuators is selectably actuated to apply direct pressure to the recessed panels 56, 86 and the sticking regions 58, 88 of the door 10 as it moves through the drop roller press 120. The cylinders 124, 130 and rollers 126, 132 cooperate to ensure that positive pressure is applied to the recessed panels 56, 86 and the sticking regions 58, 88 to promote effective bonding. Subsequently, the door 10 may be transported to a cold rolling press 150 (or other suitable press) for further pressing, then finished as desired and packaged for shipment or sale. As noted previously, the following sections provide additional details of the scanning system 100 and the drop roller press 120 with reference to FIGS. 4-6, respectively.

FIG. 4 is a schematic view of a scanning system 100 in accordance with one embodiment. With reference to FIG. 4, the scanning system 100 includes a frame 102 supporting one or more scanning subsystems 104 arranged along the frame 102 so as to cover a sufficiently wide field and ensure full coverage of a target area for properly evaluating the outer surfaces 44, 74 of the door 10. In one embodiment, the scanning subsystems 104 may include two-dimensional lasers arranged along the frame 102 at spaced out intervals such that the lasers collectively capture the entire outer surfaces 44, 74 of the door 10. It should be understood that while the illustrated and described embodiment of the scanning subsystems 104 mentions the use of two-dimensional lasers, other suitable subsystem designs capable of identifying surface features on the door 10 may be used. For example, the scanning system 100 may instead incorporate imagers, cameras, or other suitable devices capable of obtaining the target surface data from the outer surfaces 44, 74 of the door 10.

With reference to FIG. 4, in one embodiment, the scanning subsystems 104 may be positioned on the frame 102 above the door 10 such that when the door 10 is transported (via a belt conveyor, rollers, or any other suitable transport mechanism) underneath, the scanning subsystems 104 collectively obtain the surface data from the outer (front) surface 44, where the surface data indicates a position of the recessed panel portions 56, 86 and the sticking regions 58, 88, and their respective depth relative to the flat planar regions 50, 80 of the door skins 34, 38 as noted previously. In this embodiment, although the surface data from the outer (bottom) surface 74 is not obtained directly by the scanning subsystems 104, the surface data from the outer (front) surface 44 can be used to suitably approximate the corresponding location of the surface features on the outer (bottom) surface 74 since the door skins 34, 38 are substantially identical and include the same arrangement of surface features (within acceptable tolerances). Accordingly, the surface data from the outer (front) surface 44 alone can be used to indicate a position of the recessed panel portions 56, 86 and the sticking regions 58, 88 on both outer surfaces 44, 74 of the door 10 without requiring reprocessing of the door 10 to obtain data from the outer (bottom) surface 74 or a more complex scanning subsystem 104 designed to simultaneously read both surfaces of the door 10 as it passes through the scanning system 100. That being said, in other embodiments, the scanning system 100 may obtain surface data from both door skins 34, 38 either simultaneously or consecutively (e.g., the door may be flipped and transported again through the scanning system 100).

The surface data obtained by the scanning system 100 may be further processed via a processor (not shown) or programmable logic controller 110 to translate the information and develop an appropriate mapping of the location and depth of the recessed panel portions 56, 86 and the sticking regions 58, 88 on the door 10. With this mapping information, the controller 110 can direct appropriate actuation of specific pairs of cylinders 126, 132 of the drop roller press 120 as further discussed below with reference to FIGS. 5-6.

In some embodiments, the scanning system 100 may incorporate a sensor (not shown) or other suitable means to detect a presence of the door 10 and ensure the scanning system 100 is operating when the door 10 is within the field of view of the scanning subsystems 104. Data from the sensor may also be used to ensure the accuracy of the surface data mapping when the door 10 reaches the drop roller press 120 for further pressing. In other embodiments, the scanning system 100 (or the door transport mechanism) may further include one or more alignment mechanisms (not shown), such as bumpers, guides, or other suitable mechanisms designed to push against one or more side edges of the door 10 to align the door 10 as desired prior to entry into the scanning system 100.

FIGS. 5-6 are schematic views of one embodiment of a drop roller press system 120 designed for applying direct pressure to the recessed areas of the panel door 10 as identified by the scanning system 100 discussed previously. With reference to FIGS. 5-6, the drop roller press system 120 includes a first (upper) frame structure 122 supporting a plurality of upper cylinders 124, each cylinder supporting a corresponding press member 126 (e.g., a roller or other suitable member) along an end thereof. Similarly, a second (lower) frame structure 128 supports a plurality of lower cylinders 130, each cylinder supporting a corresponding press member 132 (e.g., a roller or other suitable member) along an end thereof. The press members 126, 132 are preferably made of a relatively soft, low-friction material, such as white polytetrafluoroethylene (PTFE) or another plastic material or a resilient or elastomeric material such as hard non-marking rubber. The press members 126, 132 are preferably non-marring by being made of or coated with relatively soft, low friction materials that tend not to scratch or damage door skins 34, 38 during pressing.

As illustrated in the figures, the plurality of upper and lower cylinders 124, 130, and their corresponding press members 126, 132 are arranged in a paired relationship relative to one another such that each upper cylinder 124 and press member 126 is paired with and faces a corresponding lower cylinder 130 and press member 132. A small gap 136 extends between the press members 126, 132 of the upper and lower cylinders 124, 130 to form a passageway for the door 10 as further described below. In the embodiment illustrated, a transport subsystem (e.g., a conveyor other suitable system) feeds the door 10 through the roller press system 120 via the gap 136, such that the door passes between the press members 126, 132. In some embodiments, a clamp 138 or other suitable guiding mechanism may be used to apply a pulling force on the door 10 to guide the door 10 through the roller press system 120 as needed to avoid potential jams and ensure the door 10 continues moving along at a desired rate.

In the illustrated configuration, the upper and lower cylinders 124, 130 are arranged such that they move along an axis generally orthogonal (or angled slightly from a strictly orthogonal relationship) to the horizontal axis along which the door 10 travels to drive the press members 126, 132 toward the outer surfaces 44, 74 of the door skins 34, 38 respectively. When the cylinders 124, 130 are actuated, the press members 126, 132 are moved toward and contact the outer surface 44, 74 of the door skins 34, 38. As further described in detail below, a specific subset of cylinders 124, 130 is actuated to drive the corresponding press members 126, 132 toward the door 10 along a location of the recessed panel portions 56, 86 of the door skins 34, 38 based on the surface data of the door 10 as acquired by the scanning system 100. As further described in detail below, the specific subset of cylinders 124, 130 are actuated simultaneously in pairs to apply pressure evenly to the recessed panel portions 56, 86 during pressing by drop roller press 120. This process also helps ensure that the door skins 34, 38 do not fracture or bow outwardly during the pressing operation as further described in detail below.

With particular reference to FIG. 5, the following section discusses details of a pressing procedure in accordance with one example embodiment. As noted previously with reference to FIG. 4, the surface data identifying the location of the recessed panel portions 56, 86 and the sticking regions 58, 88 is obtained by the scanning system 100 and transmitted to the controller 110. Thereafter, as the door 10 moves through the gap 136 of the drop roller press 120, the controller 110 (or other controller) actuates a specific subset of cylinders 124, 130 such that the corresponding members 126, 132 contact and apply direct pressure to the door 10 at the location of the recessed panel regions 56, 86 and transition regions 58, 88 as identified by the scanning system 100. As noted previously, the selected subset of upper and lower cylinders 124, 130 operate as a pair, so both upper and lower cylinders 124, 130 are actuated simultaneously to apply pressure to both the outer surfaces 44, 74 of the door skins 34, 38. The pressure applied by the cylinders 124, 130 and the press members 126, 132 against the panel portions 56, 86 may both crush (or compress or deform) the core 26 and ensure positive adhesive contact between door skins 34, 38, frame 20, and the adhesive layer applied therebetween.

In some embodiments, the drop roller press 120 may further include an alignment mechanism (not shown) to align the door 10 relative to the drop roller press 120 prior to entry. The alignment mechanism may help improve the accuracy of the pressing procedure to ensure that the press members 126, 132 are applying pressure to the target regions of the door 10.

After the door components are pressed, the clamp mechanism 138 may guide the door 10 away from the drop roller press 120. Thereafter, the door 10 may be fed to a separate heated press station (not shown) for curing the adhesive bonds between door skins 34, 38 and frame 20.

It will be obvious to those having skill in the art that many changes may be made to the details of the above-described embodiments without departing from the underlying principles of the invention. The scope of the present invention should, therefore, be determined only by the following claims.

The invention claimed is:

1. A system for making a door assembly of the kind having an internal frame, a core, and first and second door skins attached to the frame on either side of the core, wherein each of the door skins has a planar portion bordering at least one recessed panel portion, said system comprising:
   a scanning system operable to survey an outer surface of the first door skin and to obtain surface data therefrom identifying a location of the at least one recessed panel portion on the first door skin;
   a controller in communication with the scanning system, the controller receiving the surface data obtained by the scanning system; and
   a press in operable communication with the controller, the press including a first set of actuators and a second set of actuators, each actuator in the first and second sets of actuators including a press member coupled thereto, wherein the first set and second set of actuators are operable to drive their corresponding press member toward each other for pressing the door assembly in a pressing operation,
   wherein based on the surface data from the controller indicating a location of the at least one recessed panel portion on the first door skin, the press selectably actuates a first group of actuators from the first set of actuators and a second group of actuators from the second set of actuators during the pressing operation, such that the corresponding press members of the selected first group of actuators directly contacts the at least one recessed panel portion of the first door skin and compresses a portion of the core underlying the at least one recessed panel portion of the first door skin, and the corresponding press members of the selected second group of actuators directly contacts the at least one recessed panel portion of the second door skin and compresses a portion of the core underlying the at least one recessed panel portion of the second door skin, and
   wherein the press members of the first and second sets of actuators are separated by a gap forming a passageway through which the door assembly travels during the pressing operation.

2. The system of claim 1, wherein the press simultaneously actuates the selected first group and second group of actuators during the pressing operation.

3. The system of claim 1, wherein each actuator in the selected first group of actuators is paired with a corresponding actuator in the selected second group of actuators, and wherein the paired actuators are actuated simultaneously by the press during the pressing operation to compress the at least one recessed panel portion of both the first and second door skins.

4. The system of claim 1, wherein the first and second door skins each further including a transition region extending between the at least one recessed panel and the planar portion, and wherein the scanning system is further operable to identify a location of the transition region on the first door skin, and wherein each of the first and second groups of actuators further includes at least one actuator directly contacting the respective transition region of the first and second door skins.

5. The system of claim 1, further comprising a driver coupled to the door assembly, the driver operable to move the door assembly through the passageway between the press members during the pressing operation.

6. The system of claim 1, wherein the press members are rollers operable to rotate as the driver moves the door assembly through the press.

7. The system of claim 1, wherein the press members each include non-marring contact surfaces that directly contact the at least one recessed panel portion of the first and second door skins during the pressing operation.

8. The system of claim 1, wherein the scanning system includes one or more two-dimensional lasers.

9. The system of claim 1, further comprising an alignment mechanism operable to align the door assembly prior to entry into the press for the pressing operation.

10. The system of claim 1, further comprising a clamp configured to apply a force to the door assembly after the pressing operation.

11. A method for making a door assembly of the kind having an internal frame, a core, and first and second door skins attached to the frame on either side of the core, wherein each of the door skins has a planar portion bordering at least one recessed panel portion, said method comprising:
   surveying, via a scanning system, an outer surface of the first door skin to obtain surface data therefrom;
   identifying, via a controller, a location of the at least one recessed panel portion on the first door skin from the surface data;
   communicating, via the controller, the location of the at least one recessed panel portion on the first door skin to a press, the press including a first set of actuators and a second set of actuators, each actuator in the first and second sets of actuators including a press member coupled thereto, wherein the press members of the first and second sets of actuators are separated by a gap forming a passageway for the door assembly, and wherein the first set and second set of actuators are operable to drive their corresponding press member toward each other for pressing the door assembly in a pressing operation;
   selecting, via the press, a first group of actuators from the first set of actuators and a second group of actuators from the second set of actuators based on the surface data;
   actuating, via the press, the first group of actuators as the door assembly travels through the passageway such that the corresponding press members directly contact the at least one recessed panel portion of the first door skin and compress a portion of the core underlying the at least one recessed panel portion of the first door skin; and
   actuating, via the press, the second group of actuators as the door assembly travels through the passageway such that the corresponding press members directly contact the at least one recessed panel portion of the second door skin and compress a portion of the core underlying the at least one recessed panel portion of the second door skin.

12. The method of claim 11, wherein the press simultaneously actuates the selected first group and second group of actuators during the pressing operation.

13. The method of claim 11, wherein each actuator in the selected first group of actuators is paired with a corresponding actuator in the selected second group of actuators, and wherein the steps of actuating the first and second groups of actuators via the press is performed simultaneously during the pressing operation to compress the at least one recessed panel portion of both the first and second door skins.

14. The method of claim 11, wherein the first and second door skins each further including a transition region extending between the at least one recessed panel and the planar portion, the method further comprising:
   identifying, via the controller, a location of the transition region on the first door skin;
   actuating, via the press, the first group of actuators such that at least one of the corresponding press members directly contacts the transition region on the first door skin; and
   actuating, via the press, the second group of actuators such that at least one of the corresponding press members directly contacts the transition region on the second door skin.

15. The method of claim 11, further comprising driving, via a driver, the door assembly through the passageway between the press members during the pressing operation.

16. The method of claim 11, wherein the press members are rollers operable to rotate as the driver moves the door assembly through the press.

17. The method of claim 11, wherein the press members each include non-marring contact surfaces that directly contact the at least one recessed panel portion of the first and second door skins during the pressing operation.

18. The method of claim 11, wherein the scanning system includes one or more two-dimensional lasers.

19. The method of claim 11, further comprising aligning the door assembly prior to entry into the press for the pressing operation.

20. The method of claim 11, further comprising clamping the door assembly after the pressing operation.

* * * * *